United States Patent
Woias

(10) Patent No.: US 9,444,354 B2
(45) Date of Patent: Sep. 13, 2016

(54) VOLTAGE CONVERTER THAT STEPS UP LOW STARTING VOLTAGES TO HIGHER VOLTAGES

(71) Applicant: Albert-Ludwigs-Universitat Freiburg, Freiburg (DE)

(72) Inventor: Peter Woias, Freiburg (DE)

(73) Assignee: Albert-Ludwigs-Universitat Freiburg, Freiburg (DE)

( * ) Notice: Subject to any disclaimer, the term of this patent is extended or adjusted under 35 U.S.C. 154(b) by 0 days.

(21) Appl. No.: 14/090,586

(22) Filed: Nov. 26, 2013

(65) Prior Publication Data
US 2014/0204615 A1    Jul. 24, 2014

(30) Foreign Application Priority Data

Nov. 28, 2012    (DE) .......................... 10 2012 221 687

(51) Int. Cl.
| | |
|---|---|
| *H02M 3/335* | (2006.01) |
| *H02M 1/36* | (2007.01) |
| *H02M 7/5388* | (2007.01) |

(52) U.S. Cl.
CPC ........... *H02M 3/33523* (2013.01); *H02M 1/36* (2013.01); *H02M 7/5388* (2013.01); *H02M 3/3353* (2013.01); *H02M 3/33553* (2013.01)

(58) Field of Classification Search
CPC ......... H02M 3/33523; H02M 7/5388; H02M 1/36; H02M 3/33553; H02M 3/3353; H02M 3/335233; H02M 7/162; H02M 7/23; H02M 7/521; H02M 1/4233
USPC ........................................... 363/17, 98, 132
See application file for complete search history.

(56) References Cited

U.S. PATENT DOCUMENTS

| | | | |
|---|---|---|---|
| 4,322,724 A | | 3/1982 | Grudzinski |
| 4,408,267 A | * | 10/1983 | Pruitt .............................. 363/17 |

(Continued)

FOREIGN PATENT DOCUMENTS

JP    2005304231 A    10/2005

OTHER PUBLICATIONS

Grgic, D., Tolgay U., Kostic, M., and Reindl L. M., Ultra-Low Input Voltage DC-DC Converter for Micro Energy Harvesting, Proceedings PowerMems 2009, Washington DC, USA, Dec. 1-4, 2009, pp. 265-268.

(Continued)

*Primary Examiner* — Jessica Han
*Assistant Examiner* — Demetries A Gibson
(74) *Attorney, Agent, or Firm* — Barley Snyder

(57) ABSTRACT

The present invention relates to a voltage converter circuit for transforming a low voltage applied to its input into a higher output voltage at an output. The voltage converter circuit comprises at least one first to fourth controllable switch of a first type, which are connected to each other in the form of an H-bridge, which is arranged between the input voltage and a reference potential, and a transformer with at least one primary winding arranged in a transversal branch of the H-bridge, and with a secondary winding, at which a transformed voltage can be tapped for generating the output voltage. In parallel to at least one of the controllable switches at least one controllable switch of a second type is arranged, which is conductive without a control potential being applied. The secondary winding of the transformer is furthermore connected with the control inputs of the controllable switches for feeding back the transformed voltage.

15 Claims, 16 Drawing Sheets

(56) References Cited

U.S. PATENT DOCUMENTS

| | | | |
|---|---|---|---|
| 5,771,163 A * | 6/1998 | Moriguchi et al. | 363/71 |
| 6,549,441 B1 * | 4/2003 | Aigner et al. | 363/142 |
| 7,944,149 B2 * | 5/2011 | Imam | H05B 41/382 |
| | | | 315/209 R |
| 2005/0168296 A1 * | 8/2005 | Schulz | H03B 5/14 |
| | | | 331/175 |
| 2005/0226011 A1 | 10/2005 | Chapman et al. | |
| 2010/0195360 A1 | 8/2010 | Salerno et al. | |
| 2010/0208498 A1 | 8/2010 | Rubio et al. | |
| 2011/0241637 A1 * | 10/2011 | Parker | H02J 9/061 |
| | | | 323/282 |

OTHER PUBLICATIONS

German Search Report, dated Nov. 5, 2013, 3 pages.

U. Tietze, CH. Schenk, "Halbleiter-Schaltungstechnik", Springer-Verlag, 11th Edition, 1999, p. 985-991.

John M. Damaschke, "Design of a Low-Input-Voltage Converter for Thermoelectric Generator", IEEE Transactions on Industry Applications, vol. 33, No. 5, Sep./Oct. 1997.

Markus Pollak, Loreto Mateu, Peter Spies, "Step-Up DC-DC-Converter with Coupled Inductor for Low Input Voltages," Proceedings of PowerMEMS 2008 + microEMS 2008, Sendai, Japan, Nov. 9-12, 2008, pp. 145-148.

Markus Pollak, Loreto Mateu, Peter Spies, "DC-DC-Converter with Input Polarity Detector for Thermogenerators," Proceedings PowerMEMS 2009, Washington DC, USA, Dec. 1-4, 2009, pp. 419-422.

Ulrich Schlienz, "Schaltnetzteile und ihre Peripherie," 3rd edition, Vieweg-Verlag, 2007, p. 91 and p. 96.

Ultralow Voltage Step-Up Converter and Power Manager, Linear Technology Corporation 2010, LTC3108, 22 pages.

Auto-Polarity, Ultralow Voltage Step-Up Converter and Power Manager, Linear Technology Corporation 2010, LTC3109, 24 pages.

* cited by examiner

VOLTAGE CONVERTER THAT STEPS UP LOW STARTING VOLTAGES TO HIGHER VOLTAGES

CROSS-REFERENCE TO RELATED APPLICATION

This application claims the benefit of German Patent Application Serial No. DE 10 2012 221 687.1, filed on Nov. 28, 2012, which is hereby incorporated herein by reference.

FIELD OF THE INVENTION

The present invention relates to a voltage converter circuit for transforming a low voltage at its input into a higher output voltage at its output. In particular, the present invention relates to such a voltage converter circuit, which already starts operation at low input voltages and is completely independent from external voltage supplies. Such voltage converter circuits are needed in particular for making use of the low voltage levels that are generated with energy harvesting.

BACKGROUND

Energy harvesting is a technique for supplying distributed embedded microsystems with energy by means of energy conversion at their respective place of use. For this purpose, electrical energy is obtained from another form of energy present at the place of use, for example, from thermal, optical, chemical or mechanical energy into electrical energy by means of a respective generator.

A plurality of generator types exists in order to convert the above-mentioned energy forms into electrical energy. For the present invention, for instance, thermoelectric and photovoltaic converters are relevant as well as electrochemical cells, such as so-called biofuel cells. In most cases, these generators output DC voltage. Only in the case of a thermoelectric converter, the polarity of the output voltage is inverted, when the direction of the temperature field is inverted, which is present across the generator. All above generated principles have in common that one single converter—depending on the design and the nature of the supplied known electric input power—can yield output voltages, which are significantly below the level that is needed for operating low voltage CMOS electronics of an embedded microsystem. Furthermore, the output voltage of various generators depends on the level of the input energy. Varying energy input therefore leads to a varying output voltage of the generator.

For the above-mentioned generators, as well as in other cases, it is necessary to increase with a circuit for voltage conversion, the low output voltage of a source to such a point that an electronic circuit can be supplied with a sufficiently high voltage. A schematic representation of the basic arrangement is shown in FIG. 1. In particular, an electronic voltage converter is arranged between the generator and the electronic circuitry, which in the following is referred to as the load resistor $R_L$. The output of the generator is connected to the input of the voltage converter. The output of the voltage converter is connected to the load. As a result, the variable input voltage $V_{in}$, which is provided to the generator, is applied at the input of the voltage converter. Within the voltage converter, $V_{in}$ is transformed into a higher output voltage $V_{out}$ that is applied to the load $R_L$. The electronic system at the output of the voltage converter can additionally contain an electrical energy storage device, e.g. a rechargeable battery or an electrical capacitor. In this case, the voltage converter feeds the energy storage device and the load via its output. If the input energy at the generator breaks down, energy from the energy storage device is available in order to ensure the continuous operation of the voltage converter by feeding from the output or via a separate feed entry. This would likewise ensure that the converter circuit is functional again immediately and starts up when there is again sufficient input energy available from the generator. However, if this temporary storage is not available or has been discharged excessively, then it is necessary for the voltage converter to draw its operating energy completely from its input and already take on the function at the lowest possible input voltages.

From today's state of the art, there are known various circuit concepts which allow transforming low input voltages into higher output voltages.

One concept that is frequently used is the so-called inductive step-up converter, also known as boost converter, which is available as an integrated circuit in numerous embodiments. A description can be found in. A description can be found in U. Tietze, Ch. Schenk, "Halbleiter-Schaltungstechnik", Springer-Verlag, 11th Edition, 1999, page 985 and onwards. The basic circuit, which is reproduced in FIG. 2 comprises a switching transistor in bipolar or MOS technology, an inductor, a diode and a capacitor. A control circuit ST for generating square wave signals $V_{control}$ is furthermore required, which is supplied from an operating voltage $V_B$.

Without going into further detail about this step-up converter, it is noted that the control circuit ST needs a supply voltage $V_B$ with a sufficiently high amplitude for generating the square wave signals $V_{control}$. This is a significant problem for step-converters that have to be supplied exclusively from the input voltage $V_{in}$. The starting voltage, i.e. the lowest necessary input voltage, is determined decisively by the required operating voltage of the control circuit and the necessary amplitude of the control voltage $V_{control}$ and cannot be reduced arbitrarily. In different circuitry concepts, auxiliary circuits are used for supporting the startup phase at low voltages. However, for such an exemplary circuit, the integrated circuit TPS 61200 of Texas instruments, the lowest input voltage $V_{in}$, which is needed, still amounts to about 0.3 volts without a load at the output $V_{output}$, and to 0.5 volts with a load at the output.

In a step-up converter, the magnetic field in the core of the coil always oscillates around a mean value, which correlates to the mean value of the coil current. Consequently, the coil core always stays magnetically biased in one direction. The core of the coil therefore has to be designed in a way that even when the magnetic field oscillates around a mean value, no lossy magnetic exaggeration of the core occurs. This leads, for instance, to a correspondingly larger size of the core.

In the article *IEEE TRANSACTIONS ON INDUSTRY APPLICATIONS*, vol. 33, no. 5, SEPTEMBER/OCTOBER 1997, a resonant switched-mode converter principle based on a modified Meissner oscillator is presented, which has been developed in particular for operating at low starting voltages. The corresponding electronic component is called "starter circuit" and is shown in FIG. 3. In particular, the drain-source path of an n-channel junction field-effect transistor $T_1$ (n-JFET) is connected in series to winding 1 of a transformer Tr and subjected to electrical voltage via the input $V_{in}$ of the converter circuit. A winding 2 of the transformer Tr with a substantially higher number of windings than the winding one is interconnected to the gate of the n-JFET $T_1$ as feedback. This is achieved with a winding in a sense opposite to that of the primary winding. As a result, the positive voltage at winding generates a negative voltage at winding 2 and vice versa. The reference point of winding 2 is connected to the reference earth of the circuit via a parallel circuit with a capacitor $C_3$ and a resistor $R_1$, while the high point is connected to the gate of the n-JFET $T_1$.

For this circuit in the above-cited article, a starting voltage $V_{in}$ of about 300 mV is mentioned. The circuit takes advantage of the fact that n-JFET is already conducting at a gate-source voltage of 0 V. Thus, a current flow through winding 1 of the transformer Tr and through the n-JFET $T_1$ is already starting at low input voltages and therefore a positive voltage is generated at winding 1. The magnetic field, which is building up induces in the feedback winding 2 of the transformer a negative voltage, which is larger than the voltage at the primary winding 1 depending on the ratio of the turns of both windings. The gate source path of the n-JFET $T_1$ represents a pn diode, wherein the anode is connected to the gate. This diode limits the voltage $V_{GS}$ at the gate of $T_1$ to about +0.6 V against ground. The higher transformed voltage at winding 2 thereby charges the capacitor of the RC element ($C_3$ and $R_1$) to negative voltages VRC against ground. As soon as the current flow through winding 1 reaches an equilibrium, the voltage induced in winding 2 breaks down. Thus, the negative potential $V_{RC}$, which has been built up at the capacitor $C_3$, energizes through the gate n-JFET $T_1$ and polarizes the pn transition in the reverse direction. The closer this negative gate voltage comes to the negative terminal voltage of the n-JFET, the more transistor $T_1$ is blocked. The resulting decrease of the current in winding 1 induces a positive voltage in winding 2. This positive voltage at winding 2 is added in reverse polarity to the already existing negative gate bias. As a consequence, $V_{GS}$ further changes in the direction of negative values until transistor $T_1$ is blocked abruptly at a certain point in time. The RC element formed by $C_3$ and $R_1$, now discharges at its RC time constant, as a result of which the gate source voltage $V_{GS}$ at transistor 1 is changed from negative values back towards 0 volt with its time delay. As a consequence, the current flow through winding 1 gradually increases again as $T_1$ becomes conductive. The described process repeats.

In a winding 3 of the transformer, the self-controlled oscillation induces a further alternating voltage, with which, due to the higher winding ratio, lies above the input voltage at winding 1 by an adjustable factor. This voltage is rectified with a diode D and used as a stepped-up output voltage. The capacitors $C_1$ and $C_2$ buffer the voltages $V_{in}$ and $V_{out}$, respectively. Similar concepts based on Meissner oscillators are presented in other publications, such as "STEP-UP DC-DC-CONVERTER WITH COUPLED INDUCTOR FOR LOW INPUT VOLTAGES," *Proceedings of PowerMEMS 2008+microEMS 2008*, Sendai, Japan, Nov. 9-12, 2008, pp. 145-148, in the article "DC-DC-CONVERTER WITH INPUT POLARITY DETECTOR FOR THERMOGENERATORS," *Proceedings PowerMEMS 2009*, Washington D.C., USA, Dec. 1-4, 2009, pp. 419-422 or in the article "ULTRA-LOW INPUT VOLTAGE DC-DC CONVERTER FOR MICRO ENERGY HARVESTING," *Proceedings PowerMEMS 2009*, Washington D.C., USA, Dec. 1-4, 2009, pp. 265-268. Furthermore, to commercially use ICs of the company Linear Technology having the type designation LTC 3108 and LTC 3109 use a Meissner oscillator with a modified configuration. For the IC LTC 3108, for instance, a value of 20 mV is given as startup voltage.

However, these concepts are mostly realized as self-starting Meissner oscillators in a non-linear large signal operation. This means that the current flow through the input winding of the transformer alternatingly starts and breaks down again. Consequently, the transformer is not supplied with alternating current continuously, but is operated in a DC mode with superimposed alternating component. From this, a pre-magnetization of the core of the transformer results having all known disadvantages regarding the efficiency of the converter circuit and the dimensioning of the transformer.

For operating a transformer in a pure alternating voltage mode, different concepts of forward converters are known. These either use a transformer with two input windings, which are supplied with current alternatingly so that in the core of the transformer, a magnetic alternating field is induced, or they use a transformer with only one input winding, which is supplied with alternating current via an H bridge. This configuration therefore avoids the disadvantage of a pre-magnetization of the magnetic material within the transformer core. The control signals for the transistors at the input windings are generated with separate control circuits.

FIG. 4 shows a corresponding basic circuit of a single-ended forward converter according to the state of the art, as described for instance in U. Tietze, Ch. Schenck, "*Halbleiter-Schultungstechnik*," $11^{th}$ edition, 1999, page 990.

In this circuit, a transformer is operated with three windings. Winding 3 provides in the shown example the output voltage $V_{out}$ via a full way rectifier with four diodes. Winding 1 is alternatingly connected to the input voltage $V_{in}$ and is disconnected therefrom again via transistor $T_1$. Winding 2 is connected between the input voltage $V_{in}$ and ground via a diode D. In winding 2 as well as in winding 3, an induced alternating voltage is generated. This alternating voltage is short-circuited whenever a negative voltage is induced at the cathode of diode D. By suitably selecting the winding directions of windings 1 and 2, this is always the case if the transistor $T_1$ blocks. The corresponding current flow through winding 2 and diode D causes the magnetic field within the coil core to invert its plurality because the demagnetization current in winding 2 acts in the opposite direction compared to the current in winding 1. Further, via the current flowing in winding 2, energy is fed back into the input voltage $V_{in}$. On average and ideally, the resulting magnetization of the core is 0, having the advantage that the core of the transformer can be reduced in size and that the danger of a saturation of the core can be avoided.

Further concepts are shown in the publication U. Schlienz, "*Schaltnetzteile und ihre Peripherie*," 3rd edition, Vieweg-Verlag, 2007, page 91 and page 96. In these concepts, which are shown in FIGS. 5A and 5B, a transformer with two windings is operated in a push-pull mode. In a concept according to FIG. 5A, this is achieved by connecting a terminal of the input winding of the transformer with a capacitive voltage divider $C_1/C_2$ between the input voltage and ground, whereas the other terminal is alternatingly connected between the input voltage and ground via a half-bridge comprising MOSFET transistors $T_1$ and $T_2$. In a further concept, as shown in FIG. 5B, the input voltage is connected with changing polarity to the input winding of the transformer via a full-bridge. For rectifying the output voltage of the transformer, a plurality of concepts is known.

These forward converters also require a control circuit ST generating the corresponding square wave signals $V_{control}$ and applying same to the gate terminals of the used MOSFET transistors. Hence, this circuit concept has the same problems as the above-described step-up converter. When the whole circuit is to be operated from the input voltage $V_{in}$, the required operating voltage $V_B$ of the control circuit defines the lowest possible starting voltage.

In summary, when contemplating all known voltage converters, it can be seen that same require for controlling the internal processes within the circuits a controlled voltage that is above a defined minimal value. When using bipolar transistors and even with MOSFETs having a low control voltage, this required control voltage typical control voltage amounts to 0.3 V up to 0.6 V. This voltage is usually generated by means of control circuits and derived from an available separate operating voltage. A self-starting of these circuit concepts from input voltages in the region of several 10 mV is therefore not possible with most of the concepts. The only exceptions are the above-described resonant converters according to the principle of a Meissner oscillator. Additionally, within a controlled circuit, a continuous internal power loss occurs, which is disadvantageous regarding the efficiency of the voltage converter. Accordingly, the lowest possible starting voltage of almost all integrated or discretely mounted low voltage step-up converters is today about 0.6 V. By means of an additional auxiliary circuitry, the minimal starting voltages of about 0.3 V can be achieved. Lower starting voltages cannot be achieved according to the present state of the art. Forward converters with such low starting voltages do not exist at all up to now.

A further disadvantage of known concepts can be seen in the fact that most of the mentioned circuit concepts require transformers with more than two windings or with split windings. This increases the price and the size of the transformer. In the prior art, miniaturized transformers are known, which have only two windings and were developed particularly for converters with low starting voltages. However, for realizing a small size, they are limited regarding the ratio of the windings and the number of turns. The circuit concepts shown in the data sheets of the company Linear Technology with a LTC 3108 and LTC 3109, for instance, use a particular transformer of the company Coilcraft with maximum winding ratios of 1 to 100 between an input winding and an output winding.

A third advantage can be seen in the fact that the cited self-starting Meissner oscillators allow a low staring voltage. However, at the same time, are operated in the non-linear large signal operation. This means that the current flow through the input winding of the transformer alternatingly starts and breaks off again. Thus, the transformer is not supplied continuously with alternating current, hut is operated in a DC mode with superimposed alternating components. As a result, a pre-magnetization of the core of the transformer occurs having all known disadvantages regarding the efficiency of the converter circuit.

Consequently, an object underlying the present invention is to provide a voltage converter circuit that overcomes the above problems and disadvantages and allows in particular for energy-harvesting applications an efficient and economic voltage conversion with a self-start even at low input voltages.

This object is solved by the subject matter of the independent claims. Advantageous embodiments of the voltage converter according to the present invention are the subject matter of the dependent claims.

SUMMARY

The present invention provides a voltage converter circuit for generating an output voltage from an input voltage, which is applied to an input terminal, wherein the voltage converter circuit comprises: at least one first to fourth controllable switch of a first type, which are connected to each other in the form of an H-bridge, which is arranged between the input voltage and a reference potential; a transformer with at least one primary winding, which is arranged in a transversal branch of the H-bridge, and with a secondary winding, at which a transformed voltage can be tapped for generating the output voltage; wherein in parallel to at least one of the controllable switches at least one controllable switch of a second type is arranged, which is conductive without a control potential being applied; and wherein the secondary winding of the transformer is further connected with the control inputs of the controllable switches for feeding back the transformed voltage.

The present invention is based on the idea of operating a transformer with only required windings with a suitably modified H-bridge circuit in a way that the circuit starts on its own at low input voltages, uses the input energy as efficiently as possible and derives all the necessary control signals for the transistors of the H-bridge from the generated outward alternating voltage. Active control circuits are no longer compulsory therefor.

According to the present invention, a modified Meissner circuit is combined with an H-bridge circuit. The Meissner circuit is realized by using junction gate field effect transistors (JFETs), but is modified compared to the prior art in a way that it is an integral component of an H-bridge circuit comprising MOSFET transistors.

Advantageously, this circuit transforms a low voltage being applied at its input into a higher output voltage at its output. This circuit is particularly designed to start its operation already at low input voltages around typically 10 mV, and is thereby complete self-supplied. To this end, the circuit is supplied with energy and internal control signals from its input and from the stepped up output voltage and therefore does not need an external additional power supply.

BRIEF DESCRIPTION OF THE DRAWINGS

For better understanding of the present invention, same will be explained in more detail based on the embodiments illustrated in the following figures. Parts that are similar are given the same reference numbers and the same component designations. Furthermore, individual features or combinations of features of the shown and described embodiments can form—individually or in different combinations solutions in themselves, according to the present invention. Shown are.

DETAILED DESCRIPTION OF THE EMBODIMENTS

In the following, a first basic embodiment of the present invention is explained in detail referring to FIG. 6.

The present invention essentially represents a voltage converter circuit in bridge technique, which in particular has been designed fir a startup at low input voltages. As already mentioned, the circuit transforms a low voltage at its input into a higher output voltage at its output. The circuit in particular is designed so that it starts operation already at low input voltages of around typically 10 mV, and is thereby completely self-supplied. The circuit is supplied with energy and internal control CMOS from its input and from the stepped up output voltage.

For operating a transformer in purely alternating voltage mode, several concepts of forward converters are known, as mentioned above, which, when using an H-bridge, can advantageously use small transformers with only two windings, but cannot start up at low input voltages and also cannot be operated at a low input voltage. The voltage converter circuit according to the present invention allows in contrast thereto to operate a transformer with only two required windings with an H-bridge circuit that starts up on its own, uses the input energy optimally and derives all control signals for the transistors of the H-bridge from the generated output alternating voltage. Active control circuits are therefore no longer required.

According to the present invention, a modified Meissner circuit is combined with an H-bridge circuit. The Meissner circuit is realized by using junction gate field effect transistors (WETS) and is modified in a way that it is an integral part of an H-bridge circuit comprising MOSFET transistors.

Figure 1:
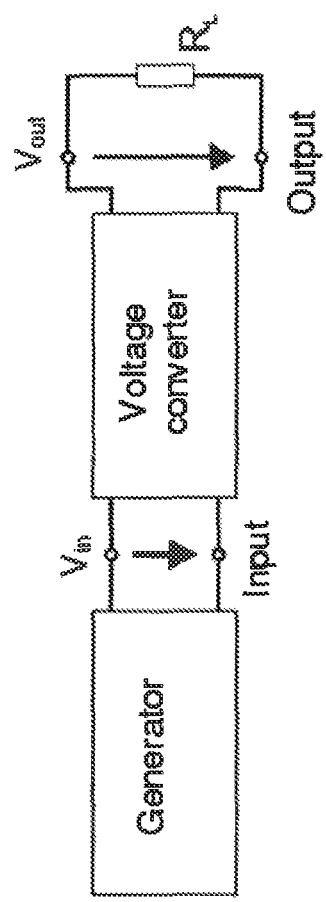
FIG. 1 is a schematic depiction of the voltage converter circuit with a connected generator and connected load.
Figure 2:
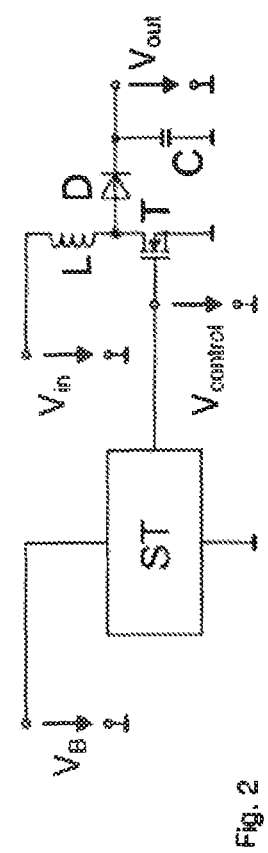
FIG. 2 depicts the circuit of an inductive step-up converter according to the prior art.
Figure 3:
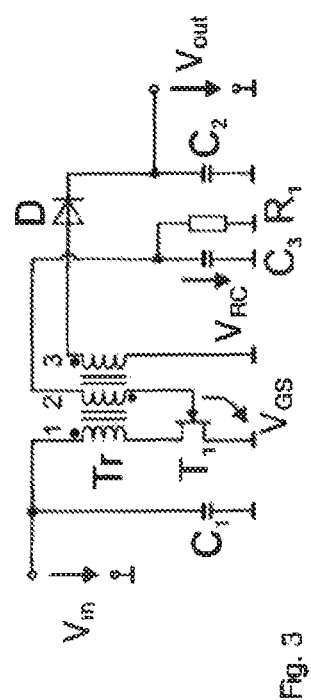
FIG. 3 depicts the circuit of a Meissner oscillator as a step-up converter according to the prior art.
Figure 4:
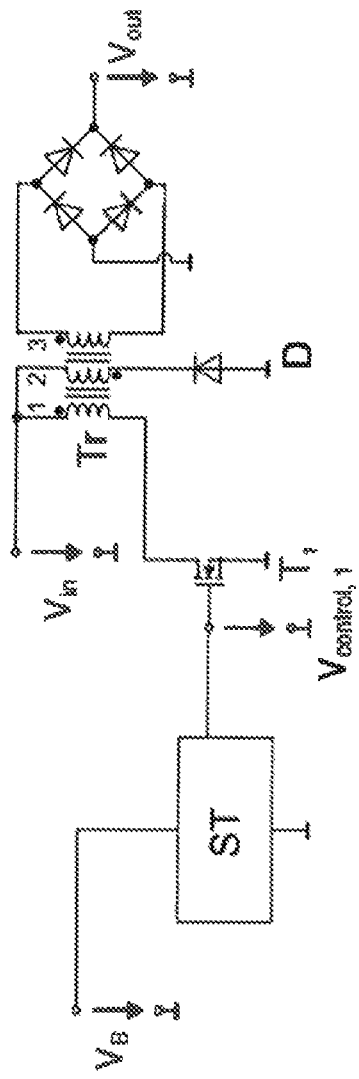
FIG. 4 depicts the circuit of an inductive forward converter according to the prior art.
Figure 5A:
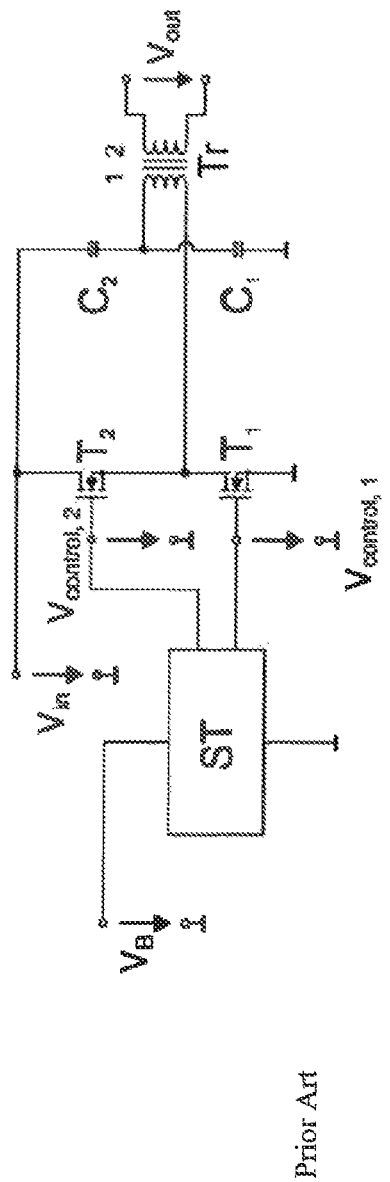
FIG. 5A depicts a circuit diagram showing a known transformer with a plurality of windings converters in a half-bridge technique using MOSFET transistors.
Figure 5B:
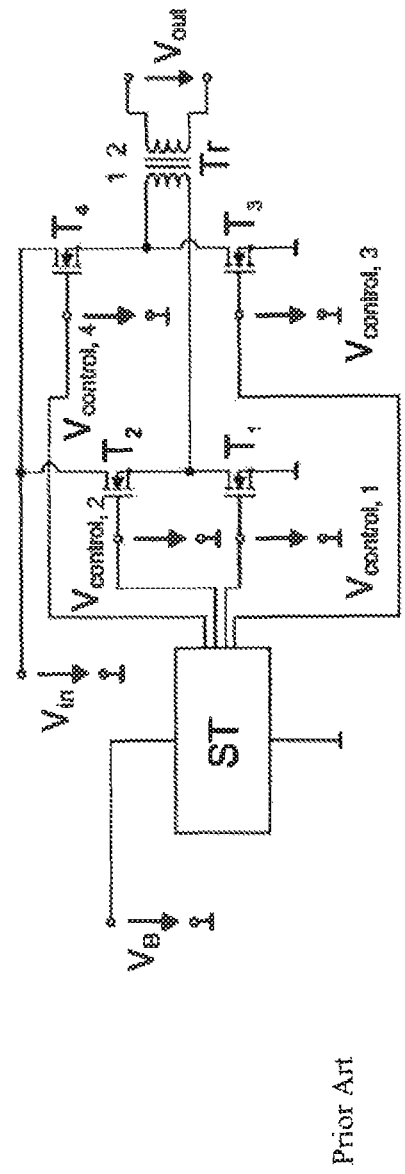
FIG. 5B depicts a circuit diagram showing a known transformer with a plurality of windings converters in a full-bridge technique using MOSFET transistors.
Figure 6:
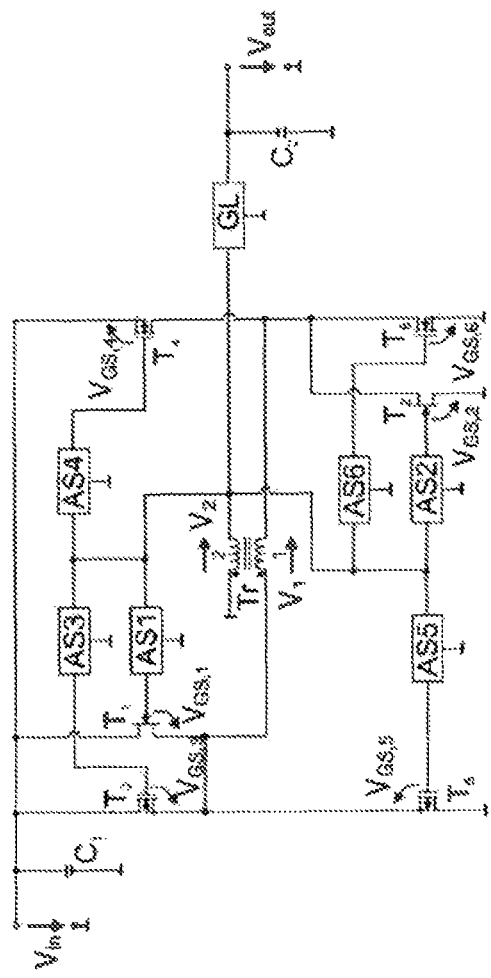
FIG. 6 depicts a first embodiment of the step-up voltage converter described herein.

FIG. 6 shows the basic circuit concept of such a combination of an H-bridge with integrated Meissner oscillator using a two-winding transformer. The circuit comprises filter capacitors, $C_1$ and $C_2$ at its input and output, an H-bridge with p-channel MOSFET transistors $T_4$ and $T_5$ (p-MOSFETs) as well as MOSFET transistors $T_3$ and $T_6$ (n-MOSFETs), which is arranged as shown between an input voltage $V_{in}$ and the common ground of the circuit.

As shown in FIG. 6, in contrast to usual H-bridge circuits, this H-bridge has two branches that are connected and in parallel. Always one p-MOSFET and n-MOSFET form one branch of the bridge, wherein in both branches of the bridge, the p-MOSFET and the n-MOSFET are alternatingly connected once with the input voltage and once with the ground of the circuit. Furthermore, in contrast to usual bridge circuits, the source terminals of both transistors are connected in branch T3-T5, whereas in branch T4 and T6, the drain terminals of both transistors are connected to each other.

In the transverse branch of the H-bridge, the winding 1 of a transformer $T_R$ is arranged. The marking dots at the schematically shown windings of the transformer each indicate the beginning of a winding with an identical sense of winding and are used to relate the winding directions of the different windings to each other. A terminal for winding which has such a dot, will be called "the high point" in the following, whereas the second terminal of the winding is called "the base point".

The base point of the winding 1 is therefore located at the connection point of the drain terminals of $T_4$ and $T_6$, and the high point is located at the connection point of the source terminals of $T_3$ and $T_5$. The winding 2, which is related to winding 1 in an adjustable winding ratio N:1 is connected with its high point to the common ground of the circuit. At the base point of winding 2, a rectifier circuit GL is connected, which rectifies the alternating voltage that is generated at this winding and provides same as output voltage $V_{out}$. Equally, the base point of winding 2 is connected via the control circuits $AS_3$ through $AS_6$ with the gate terminals of the transistors $T_3$ through $T_6$.

In parallel to transistor $T_3$, an n-channel junction gate field effect transistor (n-JFET) $T_1$ is connected in a way that its drain terminal is connected with the input voltage $V_{in}$ and its source terminal is connected to the connection point of $T_3$ and $T_5$. A further n-JFET $T_2$ is connected in parallel to transistor $T_6$, so that its drain terminal is connected to the connection point of $T_4$ and $T_6$ and its source terminal to ground. The gate terminals of $T_1$ and $T_2$ are connected via control circuits $AS_1$ and $AS_2$ with base point of the winding 2 of the transformer Tr.

The operation of a circuit according to FIG. 6 can be described as follows:

In the starting mode, i.e. directly after applying a low input voltage $V_{in}$, the circuit works as a Meissner oscillator. After applying the input voltage $V_{in}$ firstly via the path $T_1$—winding 1—$T_2$, a current flow from $V_{in}$ to ground is caused. This is due to the fact that the employed n-JFETS $T_1$ and $T_2$ already have a conducting channel at a gate source voltage of 0 V. Via these two conducting paths, a positive electrical voltage difference between the high point and the base point of winding 1 is generated. Winding 1 delays, according to known physical laws, the instantaneous starting of a flowing current. Instead, by means of the slowly increasing current flow in winding 1, a magnetic field with increasing strength is generated in transformer Tr, which induces in the secondary winding to an electrical voltage.

Due to the connection of transformer Tr as shown in FIG. 6, a negative voltage against ground is generated when a positive electrical voltage is applied between the high point and the base point of winding 1 at the base point of winding 2. This increasing negative voltage affects the gate terminals of all transistors via the corresponding control circuits, also the terminals of $T_1$ and $T_2$. The current flow through $T_1$ and $T_2$ is reduced with increasing negative gate source voltage and is finally blocked as soon as their negative cutoff voltage is reached. Thus, the current flow in winding 1 decreases. Due to the induction, this generates a positive voltage at the base point of winding 2, which in turn, controls via the belonging control circuits $AS_1$, the transistors $T_1$ and $T_2$ to be conducting.

As a result, an oscillation of the current flow through the winding 1 of the transformer is generated and therefore, an alternating voltage is generated at winding 2, which is defined by the winding ratio N:1 of the transformer.

As soon as the values of the step-up alternating voltage at winding 2 reach the region of the threshold voltages of the MOSFETs $T_3$ through $T_6$, also these transistors become via the belonging control circuits alternatingly conductive and blocked.

According to FIG. 6, the circuitry is connected in a way that when a positive voltage is present at the base point of winding 2, the n-JFETS $T_1$ and $T_2$ and at the same time the n-MOSFETs $T_3$ through $T_6$ are conducting, whereas in case of a negative voltage only the p-MOSFETs $T_4$ through $T_5$ are conducting. The circuit now works as a self-controlled forward converter in an H-bridge connection and thus, a purely alternating current supply of the transformer is generated.

The rectifier circuit of winding 2 of the transformer rectifies the step-up alternating voltage and feeds the filter capacitor $C_2$ at the output of the voltage converter.

The basic circuitry described above can be improved by several additions, which will be described in the following.

For instance, a parallel circuit comprising a plurality of n-JFET transistors $T_1$ and $T_2$ can be provided. One characteristic of JFET transistors consists in the fact that transistors with a nominally low cutoff voltage at the same time have a higher channel resistance. In the present circuit, it is desirable that $T_1$ and $T_2$ at the same have a low cutoff voltage and a low channel resistance. This can be achieved by connecting a plurality of JFET transistors of the same or different type in parallel. This parallel connection of these transistors therefore emulates a single transistor with the desired characteristics.

In FIG. 7A-7D, the embodiments of the control circuits $AS_1$ to $AS_6$ of FIG. 6 are explained in more detail. The input E always designates the connection to the base point of winding 2 of the transformer Tr, the output A designates the connection to the belonging gate terminal. Furthermore, as described, a connection of the control circuit to the ground of the circuit can be provided. Likewise, an electrical connection to the rectified output voltage $V_{out}$ can be provided in order to supply, for instance, active circuit components with energy.

Figure 7A:
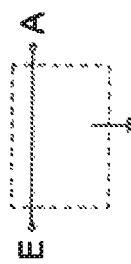
FIG. 7A depicts a first embodiment of a control circuit for the step-up voltage converter described herein.
Figure 7B:
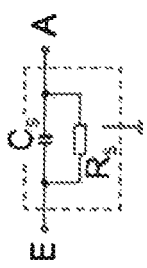
FIG. 7B depicts a second embodiment of a control circuit step-up voltage converter described herein.

A first embodiment [FIG. 7(A)] establishes a direct electrical connection from the input to the output without using additional circuit elements. The disadvantage of this embodiment consists in the fact that the gate terminal of the transistors $T_1$ and $T_2$ clamp the potential at winding 2 of the transistor to positive values around 0.6 V because in this voltage region, the gate source diodes of both transistors become conductive.

In order to avoid that disadvantage, for instance, capacitors $C_S$ and resistors $R_S$ can be arranged between the input and output alone or in combination. In a second embodiment [FIG. 7(B)], this is a parallel circuit of a resistor $R_S$ and a capacitor $C_S$. Here, the resistor limits a static current flow into the gate terminals of $T_1$ and $T_2$ and thus prevents an unnecessary loss of energy and a clamping of the voltage at winding 2, while the capacitor with its complex impedance lets an alternating current path and thus provides the necessary control current dynamically.

Figure 7C:
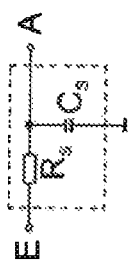
FIG. 7C depicts a third embodiment of a control circuit step-up voltage described herein.

In a third embodiment [FIG. 7(C)], an RC low pass is used between input, output and ground as a control circuit. Thus, a lagging phase shift between the input and output of the control circuit can be generated.

Figure 7D:
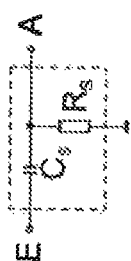
FIG. 7D depicts a fourth embodiment of a control circuit step-up voltage herein.

In a fourth embodiment [FIG. 7(D)], an RC high pass is used at a control circuit between the input, output and circuit ground. Thus, a leading phase shift between the input and output of the control circuit can be generated.

In a fifth embodiment, (not illustrated), a plurality of transistors can be operated at a common control circuit. This means that the output of the control circuit is connected to a plurality of gate terminals of the transistors T1 to T6. It is advantageous that, for instance, by interconnecting the gate terminals of T1 and T5 at the output of a common control circuit, the clamping of the voltage VGS,1 at the gate of n-JFET T1 can be used to protect the p-MOSFET T5 from an undue (excessive) positive gate source potentials VGS,5. Likewise, the clamping of the voltage VGS,2 at the gate of the n-JFET T2 can be used for protecting the p-MOSFET T4 from undue (excessive) positive gate source potentials VGS,4 by interconnecting the gate terminals of T2 and T4 at the output of a common control circuit.

According to the present invention, the switching on of the load is only performed after the oscillator started with its oscillations: An ohmic or capacitive load at the output of the circuit would be inhibiting for the oscillator. Hence, a higher starting voltage $V_{in}$ would be required. Therefore, it is advantageous to connect the load and, if necessary, also the output filter capacitor with the output voltage $V_{out}$ only after the voltage conversion has safely started, i.e. after the circuit started working in the H-bridge mode.

Figure 8:
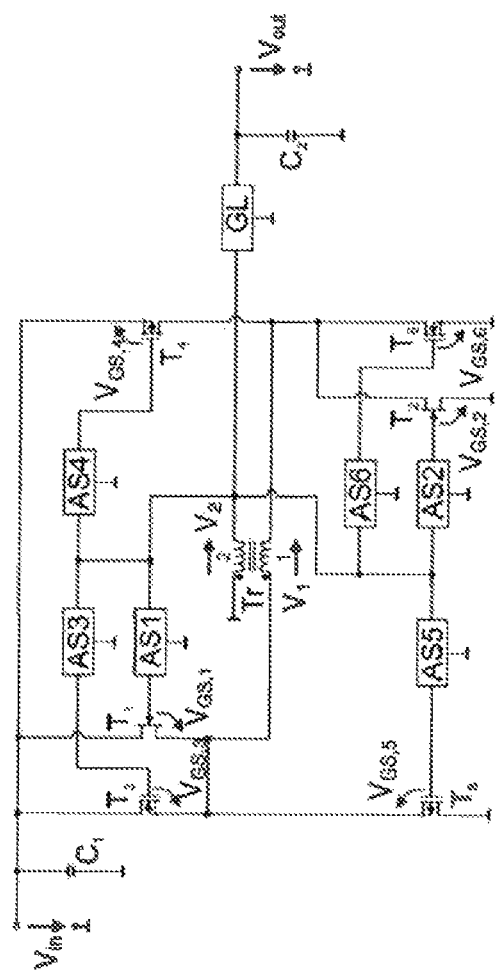
FIG. 8 depicts a first embodiment of the step-up voltage converter described herein having an additional voltage controlled switching on of the load at the output.

FIG. 8 shows a first embodiment, thereto with a full-wave rectifier. In FIG. 8, a voltage monitoring circuit SU with an integrated switch S monitors the DC voltage $V_{2a}$, which is smoothed by means of small filter capacitor $C_{2a}$. At the same, the voltage monitoring circuit SU is supplied from the output voltage $V_{2a}$ of the full-wave rectifier. The filter capacitor $C_{2a}$ is dimensioned in a way that it achieves a smoothing of output voltage of the rectifier in order to operate the voltage monitoring circuit SU with a DC voltage, but at the same time, does not represent a too high current load for the oscillator during its charging process in the startup phase. Upon exceeding an adjustable threshold of the voltage $V_{2a}$, which should be selected in a way that the circuit is already operating in the more power-efficient H-bridge mode, the monitoring circuit SU connects the output of the circuit via S with the externally connective load and if necessary, with an externally connected second filter capacitor, $C_{2a}$. An example of a commercially available voltage monitoring circuit with an integrated switch is the IC series TC54 of the company Microchip, which is called "Voltage Detector".

Figure 9:
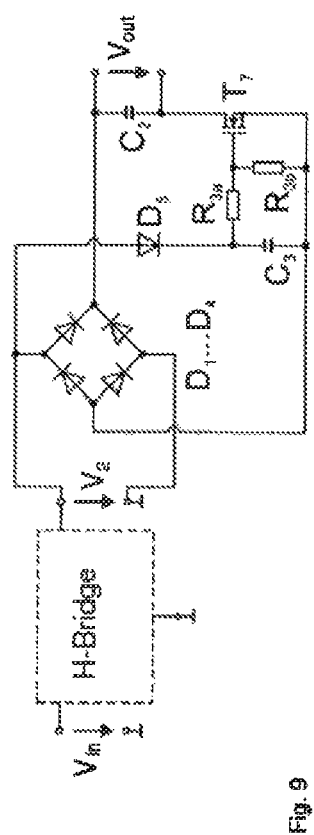
FIG. 9 depicts a second embodiment of the step-up voltage converter described herein having an additional voltage activation of the load at the output.

FIG. 9 shows a second embodiment of a voltage monitoring with switching on:

As shown here, the peak value of the positive amplitude of the voltage at the base point of winding 2 is monitored by means of a peak value rectifier comprising a diode $D_5$, a capacitor $C_3$, a voltage divider $R_{3d}/R_{35}$ and n-channel-MOSFET T. As soon as the rectified voltage at the gate of $T_7$ exceeds the threshold voltage of $T_7$, this transistor connects the load, and if necessary, the filter capacitor $C_2$ to the circuit. Also in this embodiment, it is advantageous to perform this step only in the H-bridge operation of the circuit.

Furthermore, a prevention of overlapping switch-on regions in the H-bridge is provided. The circuit according to FIG. 6 can be considered as problematic in that the n-JFETs $T_1$ and $T_2$ still conduct current until their negative gate source clamping voltage is applied. Consequently, a transverse current can occur in the bridge path $T_1$-$T_5$, if the n-JFETs $T_1$ is still conductive during negative voltages at the base point of winding 2 in a particular voltage region, while the p-MOSFET $T_5$ already starts to be conductive when a negative gate source voltage $V_{GS,5}$ is present. The same is valid for the bridge path $T_2$-$T_4$. Thereby, unnecessary losses are generated in the circuit. This effect can be reduced by means of the following design and circuit technical measures, which can be applied individually or in combination:

using p-MOSFET transistors and n-JFET transistors with threshold voltages and cutoff voltages, which overlap only in a small region or not at all, whereby the harmful overlap of the conducting phases of these transistors can be reduced or eliminated completely;

using a delaying or phase lagging control circuit AS at the gate of the p-MOSFET transistors; and using a phase leading control circuit AS at the gate of the n-JFET transistors.

Figure 10A:
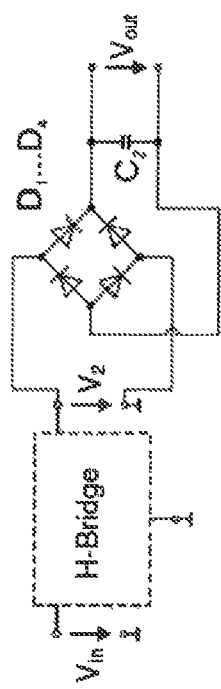
FIG. 10A depicts a rectifier circuit for the step-up voltage converter according to the invention.
Figure 10B:
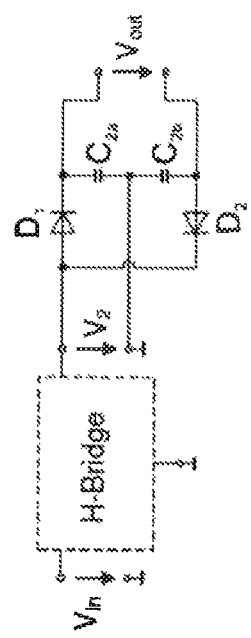
FIG. 10B depicts another rectifier circuit for the step-up voltage converter according to the invention.

For the rectifier circuit GL at winding 2, the concepts that are known according to the prior art can be used. They are preferably realized using Shottky diodes with a low flow voltage in order to keep the losses in the rectifier low. FIG. 10 shows several possible embodiments:

a known full-wave rectifier according to Graetz [FIG. 10(A)], known voltage multipliers, for instance, the concept shown herein according to Delon, [FIG. 10B] or other concepts, for instance, the concept according to Villard.

Further, the rectifier circuit can also comprise an active rectifier using MOSFET transistors.

As a next variant in the following, an H-bridge with a combined Meissner oscillator using a 3-winding transformer is described.

Figure 11:
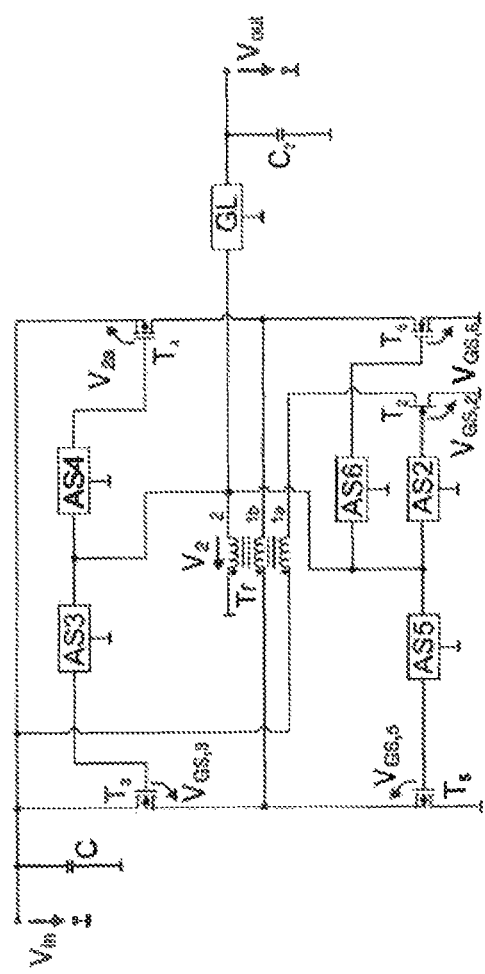
FIG. 11 depicts a second embodiment of the step-up voltage converter described herein with an additional transformer winding.

FIG. 11 shows the basic circuit concept of this combination.

According to this variant of the invention, the Meissner oscillator is formed with at least one n-JFET $T_2$, an input winding 1a of the transformer Tr and an output winding 2a. Compared to Variant 1 the n-JFET $T_1$ and the belonging AS1 are dispensed with. Instead the high point of the winding 1a is directly connected to the input voltage $V_{in}$ while the base point is connected to ground via $T_2$. All other components correspond to Variant 1, with the only difference that now a separate winding 1b is arranged instead of the winding 1 in the transversal branch of the H-bridge.

The operation of the Meissner oscillator and its role in the startup phase of the voltage converter corresponds to the concept of Variant 1. A difference can be seen in the fact that here only one n-JFET is connected in series to the winding 1a. Thus, in comparison to Variant 1, the ohmic losses and voltage drops at this single n-JFET $T_2$ are smaller. The circuit further starts at lower input voltages $V_{in}$ because the remaining voltage drop at winding 1 becomes larger.

Likewise, with Variant 2, the problem of the overlapping switching on regions of the n-JFETs and MOSFETs in the H-bridge can be avoided. Thus, the selection of all transistors and their belonging control circuits can be made with a higher degree of design freedom. Additionally, the winding numbers of the separate windings 1a and 1b can be selected independently in their ratio to the winding 2. This provides a degree of design freedom regarding the startup voltage, which can be determined with a winding ratio 1a:2 and the step-up ratio in the bridge operation, which is mainly determined by the winding ratio 1b:2.

All further embodiments of Variant 2 correspond to the shown embodiments of Variant 1.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A voltage converter comprising:
    an input voltage source;
    an output voltage terminal at which an alternating current voltage is developed;
    a reference voltage source;
    an H-bridge circuit:
      (a) between the input voltage source and the reference voltage source, and
      (b) having:
        (1) a first controllable H-bridge circuit switch branch between the input voltage source and the reference voltage source, and
        (2) a second controllable H-bridge circuit switch branch between the input voltage source and the reference voltage source;
    a transformer having:
      (a) a primary winding in the first controllable H-bridge circuit switch branch, and
      (b) a secondary winding at which the alternating current output voltage is developed and connected with the output voltage terminal;
    at least one of an ohmic resistance and a reactive impedance connected between the output terminal and control terminals of the first controllable H-bridge circuit switch branch and the second controllable H-bridge circuit switch branch to passively apply the alternating current output voltage to the control terminals of the first controllable H-bridge circuit switch branch and the second controllable H-bridge circuit switch branch;
    first n-JFET connected in parallel with the first controllable H-bridge circuit switch branch between the input voltage source and a first terminal one primary winding; and
    a second n-JFET connected in parallel with the second controllable H-bridge circuit switch branch between a second terminal of the primary winding of the transformer and the reference voltage source, so that when an input voltage is applied, a current flows though the n-JFETs and the primary winding towards the reference potential.

2. The voltage converter according to claim 1 wherein the first controllable H-bridge circuit switch branch and the second controllable H-bridge circuit switch branch are connected in parallel.

3. The voltage converter according to claim 1 wherein the first controllable H-bridge circuit switch branch and the second controllable H-bridge circuit switch branch are connected in anti-parallel.

4. The voltage converter circuit according to claim 1, wherein the controllable H-bridge circuit switch branches include at least one field effect transistor with an insulated gate (MOSFET).

5. The voltage converter circuit according to claim 4, wherein the controllable H-bridge circuit switch branches include at least one junction gate field effect transistor (JFET).

6. The voltage converter circuit according to claim 3, wherein:
    (a) the first controllable H-bridge circuit switch branch includes a p-MOSFET and an n-MOSFET and the n-MOSFET is connected with the input voltage source and the p-MOSFET is connected with the reference voltage source, and (b) the second controllable H-bridge circuit switch branch includes a p-MOSFET and an n-MOSFET and the p-MOSFET is connected with the input voltage source and the n-MOSFET is connected with the reference voltage source.

7. The voltage converter circuit according to claim 6, wherein:
   (a) the source terminals of the MOSFETs in the first controllable H-bridge circuit switch branch are connected to each other, and
   (b) the drain terminals of the MOSFETs in the second controllable H-bridge circuit switch branch are connected to each other.

8. The voltage converter circuit according to claim 1, further comprising a rectifier circuit for rectifying the alternating current voltage at an output winding of the transformer.

9. The voltage converter circuit according to claim 1, wherein the secondary winding of the transformer is connected with control inputs of the controllable switches via at least one control circuit each.

10. The voltage converter circuit according to claim 1, wherein at least one of the control circuits comprises an RC low pass filter, an RC high pass filter or a parallel connection of a resistance and a capacitance.

11. The voltage converter circuit according to claim 10 wherein the controllable switches are connected via a common control circuit to the secondary winding of the transformer.

12. The voltage converter circuit according to claim 1, further comprising a voltage monitoring circuit for connecting and separating the load to and from the output voltage terminal in a controlled way.

13. The voltage converter circuit according to claim 12, wherein the voltage monitoring circuit comprises an integrated switch.

14. The voltage converter circuit according to claim 12, wherein the voltage monitoring circuit comprises a peak value rectifier.

15. The voltage converter circuit according to claim 1, wherein the transformer has a second primary winding connected with the second controllable H-bridge circuit switch branch between the input voltage source and the reference voltage source.

* * * * *